(12) United States Patent
Cresens

(10) Patent No.: US 6,496,633 B1
(45) Date of Patent: Dec. 17, 2002

(54) LIGHT GUIDE

(75) Inventor: Marc Cresens, Diest (BE)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 09/619,109

(22) Filed: Jul. 19, 2000

Related U.S. Application Data

(60) Provisional application No. 60/147,126, filed on Aug. 4, 1999.

(30) Foreign Application Priority Data

Jul. 28, 1999 (EP) .............................................. 99202494

(51) Int. Cl.$^7$ .............................. G02B 6/20; G02B 6/06
(52) U.S. Cl. ........................................ 385/125; 385/116
(58) Field of Search ................................ 385/125, 115, 385/116, 119, 120; 362/554, 556

(56) References Cited

U.S. PATENT DOCUMENTS

| | | | |
|---|---|---|---|
| 3,853,658 A | * 12/1974 | Ney | |
| 3,950,073 A | 4/1976 | Horiguchi et al. | |
| 3,976,357 A | * 8/1976 | Lohmeyer | 385/125 |
| 4,150,870 A | * 4/1979 | d'Auria | |
| 4,591,232 A | * 5/1986 | Jeskey | |
| 5,013,128 A | 5/1991 | Stern et al. | |
| 5,384,882 A | * 1/1995 | Shimamune | 385/116 |
| 5,693,043 A | 12/1997 | Kittrell et al. | 606/15 |
| 5,715,345 A | * 2/1998 | McKinley | 385/115 |
| 5,799,126 A | * 8/1998 | Nagatani et al. | 385/146 |
| 6,078,714 A | * 6/2000 | Cavanaugh | 385/115 |

FOREIGN PATENT DOCUMENTS

| DE | 4332699 | | 3/1995 |
| JP | 56-119108 A | * | 9/1981 |

\* cited by examiner

*Primary Examiner*—Hemang Sanghavi
*Assistant Examiner*—Mike Stahl
(74) *Attorney, Agent, or Firm*—John A. Merecki; Hoffman, Warnick & D'Alessandro

(57) ABSTRACT

A light guide comprising an entrance window, an output window and a multiplicity of light channels for transmitting light falling onto the entrance window towards the output window by internal reflection, wherein the light channel consists of light guiding core material which is enclosed in a cladding gas having a refractive index that is lower that the refractive index of the core material.

5 Claims, 15 Drawing Sheets

LIGHT GUIDE

This application claims the benefit of Provisional Application Ser. No. 60/147,126 filed Aug. 4, 1999.

FIELD OF THE INVENTION

The present invention relates to a light guide member. More particularly the invention relates to a light guide member for use in a read out apparatus wherein a stimulable phosphor sheet on which a radiation image has been stored is illuminated with stimulating rays which cause the phosphor to emit light in proportion to the amount of energy stored therein during its exposure to radiation, and wherein light emitted upon stimulation is guided by the light guide member from the phosphor to a light detector.

BACKGROUND OF THE INVENTION

Light guide members that are suitable for the above application are known in the art.

A first type of such light guide members consists of a sheet of light transmitting material. In a read out apparatus one end of the sheet is placed adjacent to a scan line and the other end is located adjacent to the light receiving face of a photodetector.

The end of the light guiding member which is adjacent to the scan line is shaped into a linear form and the other end which is to be located adjacent to the light receiving face of a photodetector is shaped into an annular form to be adapted to the light receiving face of the photodetector.

A light guide member of the above-named kind has been described in U.S. Pat. No. 4,485,302. The described light guide member is made of a material that is transparent to light emitted by the phosphor. It is finished to have a smooth surface so that the light transmitted thereto is effectively subjected to total reflection by the internal surface.

Suitable materials which have adequate properties for light guiding are transparent thermoplastic resins such as acrylic resin, vinyl chloride resin, polycarbonate resin, polyester resin, epoxy resin or glass.

An alternative embodiment of such a light guide has been described in U.S. Pat. No. 5,352,903 and has two light input end faces being arranged so as to face the same scanning line. The first light end face is arranged for collecting light emitted from the front face of the stimulable phosphor sheet whereas the second light input face is arranged for collecting light emitted from the back surface of the phosphor sheet.

Portions of the light guide member which are adjacent to the output end faces are cut into a plurality of strips which are bundled, and end faces of the bundled strips are located in close contact with a detector, e.g. a photodetector.

In order to capture as much light as possible and to effectively guide the incoming light from the inlet towards the outlet of the light guide member, it is necessary that the probability of internal reflection is optimised and that loss of light inside the light guide member is reduced to a minimum.

In order to obtain these objectives, the shape of the sheet should be optimised and its surface should be smoothed. Preferably the light guide member should be made of a transparent sheet curled into a shape having a linear or arcuate inlet and an annular outlet.

Furthermore in order to enhance light transmission efficiency, the curvature of the sheet should be made small so as not to interrupt the repeated internal reflections.

Consequentially the length of the sheet should be long enough to allow the small curvature.

Another type of light guide members consists of a number of individual optical fibres that are arranged in a row at the side of the phosphor sheet to be scanned and bundled at the side of the photodetector.

The optical fibers used in this type of light guide are conventional optical fibers that consist of a core material surrounded by a solid cladding material having a lower refractive index than that of the core material.

Light emitted by a phosphor upon stimulation enters the light guide member and is guided inside the fibres by internal reflection towards the output end of the light guide member where the fibers are bundled e.g. to form a circular plane that can be coupled to the entrance window of a detector such as a photomultiplier.

Unfortunately the acceptance angle of these conventional optical fibers is only about 62 degrees equivalent to a numerical aperture equal to about 0.51. Although fibers having a higher numerical aperture exist, they all show higher attenuation in the near ultraviolet region. This is undesirable since storage phosphors screens frequently emit light in this spectral region.

Furthermore, when the light guiding trajectory is curved, the numerical aperture of the optical fibers decreases since even at moderate curvature the optical fibers are no longer able to guide marginal rays of light entering the input window of the light guide towards the output window.

Furthermore, due to inter fiber surface losses and due to losses at the entrance window of the light guide member because of the presence of cladding material, the light guide members consisting of optical fibers may lose about 15 to 20% of their optical efficiency.

OBJECTS OF THE INVENTION

It is an object of the present invention to provide a light guide that has a high optical efficiency. It is a further object to provide such a light guide for which the light guiding efficiency remains high even at a strong curvature of the light guide or part thereof.

SUMMARY OF THE INVENTION

The above mentioned objects are realised by a light guide having the specific features defined in the claims.

The new concept supports a light acceptance angle of 180 degrees equivalent to a numerical aperture equal to 1.

When compared with the prior art light guide concepts that are based on optical fiber assemblies, the concept of the present invention is thus advantageous in that a much higher numerical aperture can be attained. This higher numerical aperture remains constant over a wider curvature range of the light guiding member.

At a given numerical aperture a much stronger curvature of the light guide is still acceptable so that the apparatus wherein the light guide is placed can be made much more compact, as will be shown furtheron.

Depending on the application, the light-guide assembly can have a single or multiple input and output windows.

The spectrum of the light can cover areas such as:

Ultra-Violet, Visual and Infra-Red thereby supporting efficient transport of photons from narrow and wide band spectrum light-sources.

The transfer of light between input and output is done by a multitude of light-channels.

These channels have a solid structure and can be made out of any type of light-guiding material with a low degree of internal scattering and with a low absorption for the spectrum of the light it has to transport from input to output.

Possible channel materials are optical grade plastics such as polymethylmethacrylate (in the following referred to as PMMA), Poly Carbonate and Poly Styrene or they can be any member of a silica-based variety of optical glass materials.

Unlike optical fibers the light carrier (or light channel) itself does not have a solid cladding material with a lower refractive index surrounding the core material. Instead the light channel according to the present invention entirely consists of "core" material.

These "core" channels are suspended in a gas having a much lower refractive index than the core material. This concept ensures the highest possible numerical aperture even at relatively strong curvatures when compared with conventional fiber technology, as will be proved further on.

Light travels through the channels by means of consecutive total internal reflection at the glossy (microscopically quasi flat surface) and clean interface between the channel-material (the core) and the surrounding gas (the clad).

Ambient air or other gasses can be used as cladding gas.

The light-guide assembly can consist of channels with different cross-sections and cross-section shapes.

Circles, ellipses, squares, rectangles, hexagons or any other type of polygon or free shape can be used as the light-channels cross-section shape.

However, in order to preserve a 180 degrees acceptance angle, the individual light channels preferably have a constant or increasing cross-section along the channel's three dimensional trajectory from input to output.

In a particular embodiment of the present invention, the individual light-channels are fused at the light input and/or light output sides by heat and by pressure to form core material blocks. These blocks preferably have the shape of the input and/or output windows of the light guide. The fusion-depth of the material block is preferably a few millimeters along the light-trajectory. Within the fused areas the boundaries of the individual channels have completely disappeared.

Since the blocks do not contain gaseous or other enclosures they are totally transparent and have a full 100% fill-factor at the window surfaces. This is especially important for the light-collection efficiency at the input-window.

The 100% hermetically sealed solid window-blocks may be polished for efficient light-coupling.

Since the blocks are hermetically sealed, the penetration of contamination due to capillarity in surface pits or cracks is avoided.

This is an advantage when compared to traditional light-guides using optical fibers. Such optical fiber assemblies may lose 15 to 20% of optical efficiency due to the inter-fiber surface losses and the cladding material surface losses at the input window.

In one embodiment the window blocks are suspended at the input and/or output windows by means of optical window plates. Preferably the same material as the core material is used for the window plates, alternatively they can be glass-based or plastic-based too.

They are preferably fused to the core material blocks.

Alternatively these plates can be glued to the core material blocks. Preferably index-matching optical cement is used for glueing in order to obtain minimal added reflections at the interfaces.

These window plates should preferably be spectrally suited to guide the light travelling through the light-guide.

A surrounding system is provided and arranged to hold the window plates in place.

An alternative but optically slightly less performing way of holding the fused and polished window blocks is to grab them at the sides by means of a tight-fitting frame-work of short reflectors. The reflectors are arranged along the trajectory path's extremities.

These reflectors should preferably be specular and spectrally suited to reflect the light travelling in the light-guide.

Likewise a surrounding system can be provided to hold the reflectors in place.

The light-guide assembly is suspended in a surrounding gas (the "clad" material). It may be protected from contamination and from entrance of external light by means of a light-tight and dust-tight enclosure spanning the input and output windows. This cover is preferably not touching the individual light channels.

At the level of the interface with other system components the light-guide can be equipped with an optional anti-reflection coating or it can be coupled with other system components using optical oil mounts (removable) or optical cement (fixed).

An optional anti-reflex coating, the oil mount or the cement helps to reduce optical reflections at the light-guides boundaries and should preferably be spectrally suited to guide the light.

Preferred embodiments of the invention are disclosed in the dependent claims.

Further advantages and embodiments of the present invention will become apparent from the following description and drawings.

DETAILED DESCRIPTION OF THE INVENTION

Figure 1:
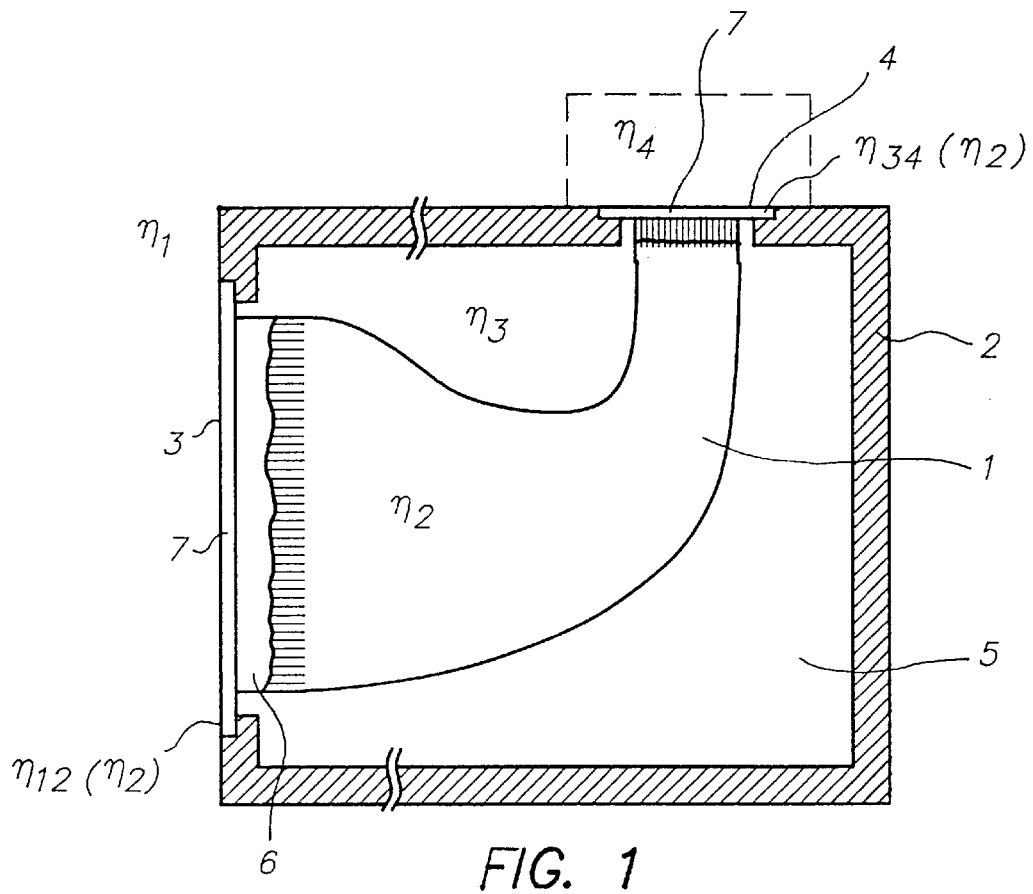
FIG. 1 shows a first embodiment of a light guide according to the present invention, the so-called window-plate type.

FIG. 1 shows a first embodiment of a light guide according to the present invention. This first embodiment is referred to as the window-plate type embodiment.

The light guide comprises a bundle of individual non-cladded light channels 1 suspended in a light and dust tight enclosure 2 preferably made out of a low evaporation type material such as aluminum or ABS "Novodur" (Acrylnitril-Butadien-Styrolcopolymer, Novodur is a trade name of Bayer AG).

The bundle extends from an entrance window 3 to an output window 4.

The individual light channels consist of core material. The refractive index of this material is $\eta_2$. In a specific embodiment this core material is polymethylmethacrylate.

The bundle of light channels is surrounded by a cladding gas 5, having a refractive index $\eta_3$, which should be much lower than the refractive index of the core material. In this example this cladding gas is air.

Since a numerical aperture defined as N.A.$=(\eta_2^2-\eta_3^2)^{1/2}$ is envisaged which is equal to 1, it follows that $(\eta_2^2-\eta_3^2)=1$ or $\eta_3<(\eta_2^2-1)^{1/2}$. Or put otherwise, it is required that $\eta_2>(\eta_3^2+1)^{1/2}$.

At the side of entrance window 3 the individual light channels are fused (by heat and pressure) to become a core material block 6. This block has the shape of the light-guide's window and the fusion-depth is a few millimeters in the direction of the trajectory the light follows within the light guide. Within the fused areas the boundaries of the individual channels have completely disappeared.

It is also possible to provide the same kind of core material block at the side of the output window (not shown), although this is not necessary for better light coupling.

The window block(s) 6 are suspended at the input window and occasionally at the output window by means of optical window plates 7.

These window plates should preferably be spectrally suited to guide the light travelling through the light-guide.

The window plates are for example plastic-based or glass-based materials, having a refractive index $\eta_{12}$ (for input window) or $\eta_{34}$ (for output window). Preferably the plate material is the same material as used for the light guiding channels because this provides best optical efficiency. (In this case $\eta_{12}$ and/or $\eta_{34}$ equal(s) $\eta_2$.

In this example the window plates are made of polymethylmethacrylate.

Figure 2:
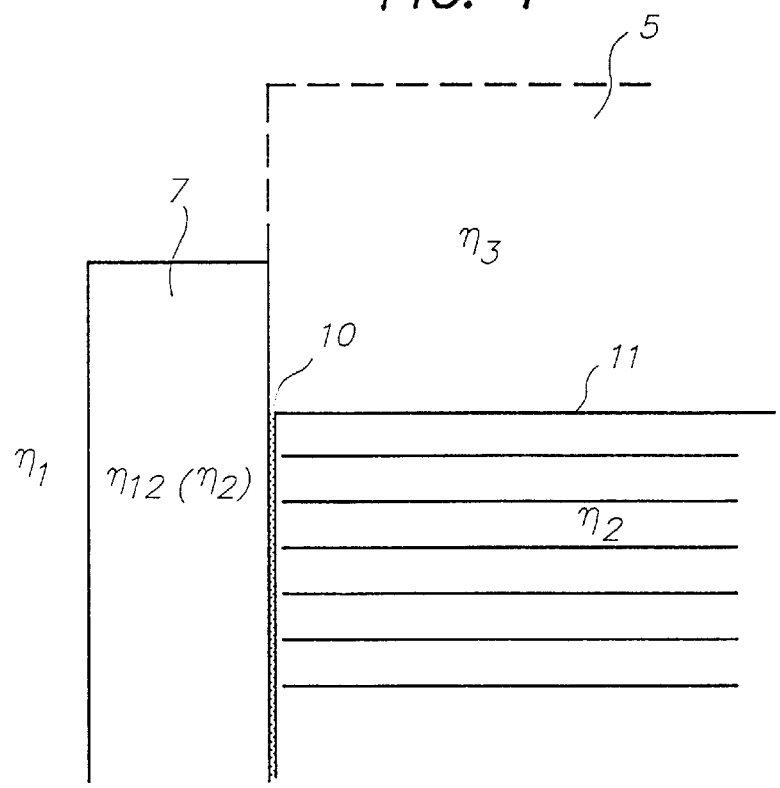
FIG. 2 is a detailed view of the interface between the channel and the plate in the window-plate type light guide shown in FIG. 1.

A detailed view is shown in FIG. 2.

The window plates 7 can be fused or glued to the core material blocks at the outer ends of the light guides.

The core material blocks have been fused and polished. The glueing to the light guide's core material blocks is preferably done with index-matching optical cement for optimal light-coupling.

This example features a rectangular input window of 7 mm+330 mm with a maximum trajectory length of 500 mm between the input and output windows. The input window surface equals 2310 mm2.

Choosing for a 3 mm diameter non-cladded PMMA (poly methyl methacrylate) core material channel, 3 layers are stacked to a 60 degree stacked height of 8.196 mm (optimally stacked) in close proximity of the input window.

Two layers contain 110 channels and one layer contains 109 channels. These 329 channels represent a total PMMA surface equal to 2326 mm2.

A Cross-Section Compression Factor (CSCF) of 1.007 results from compressing these three heated layers to a rectangular solid PMMA block with dimensions: 7 mm+330 mm (equal to the input-window surface).

The output bundle diameter is 58 mm when the 329 channels are arranged into a circular bundle.

This diameter allows for an additional 3% of excess surface on top of the residual 9.311% inter-channel surface (90.689% PMMA in an optimally stacked surface).

Optimal optical efficiency is obtained by taking care that the corner 10 between the window plate 7 and the bundle of light channels 1 is very clean and that the outer side surface 11 of the light channel is clean, glossy and scratch free, that the cladding gas 5 is a pure and inert gas so that no chemical reaction occurs with the channel material and with the enclosure material which could have an etching effect on the channels or could deposit a substance with a different refractive index to the channel walls.

Figure 3:
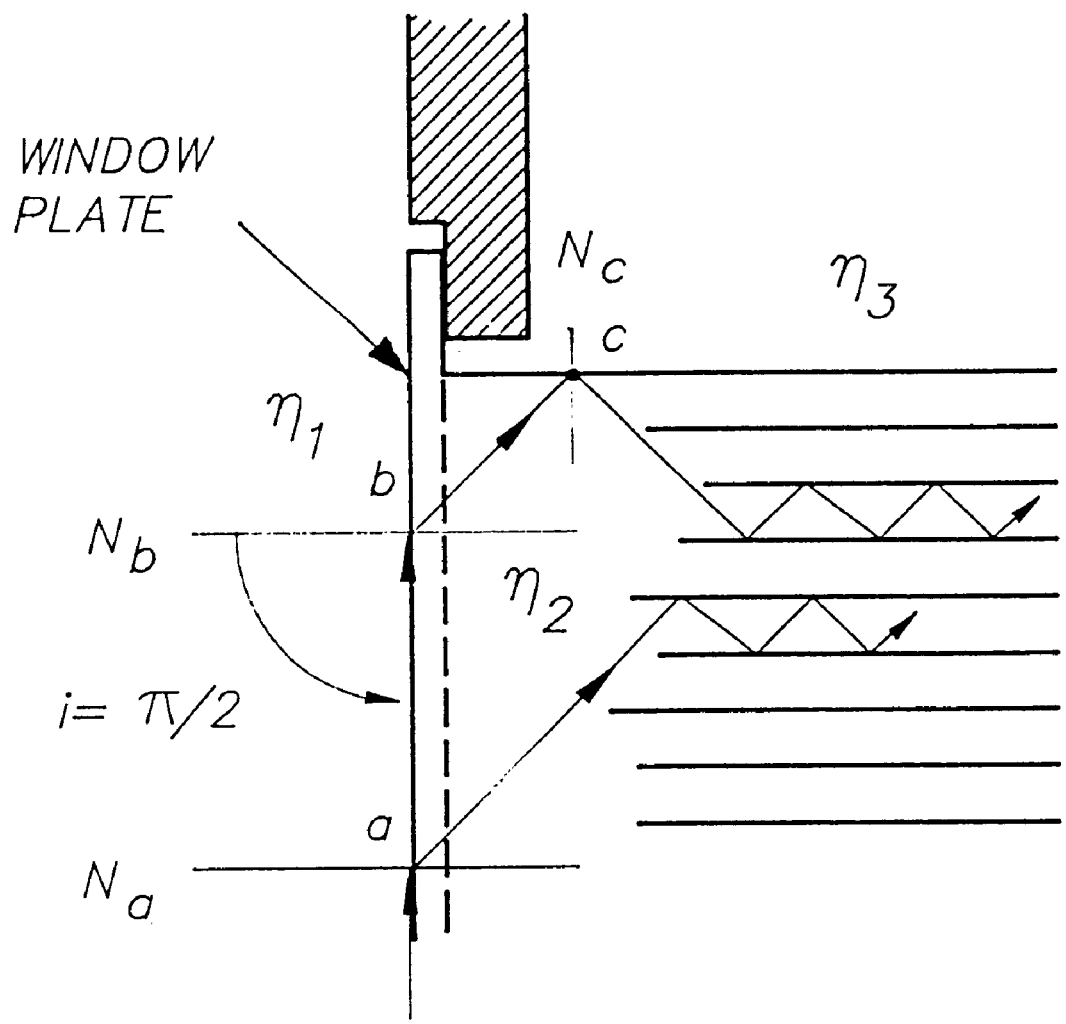
FIG. 3 illustrates the trajectory followed by rays of light entering the light guide.

FIG. 3 illustrates the trajectory followed by rays of light entering the light guide.

The numerical aperture of the light guide of this example is equal to 1, the maximum angle i is $\Pi/2$. The fill factor being defined as the ratio between the total surface of all the light-guide material within a window relative to the windows total surface is equal to 100%. It is an extremely important factor at the input window and should be equal to 1 for best optical coupling between a light-source and the light-guide.

Figure 4:
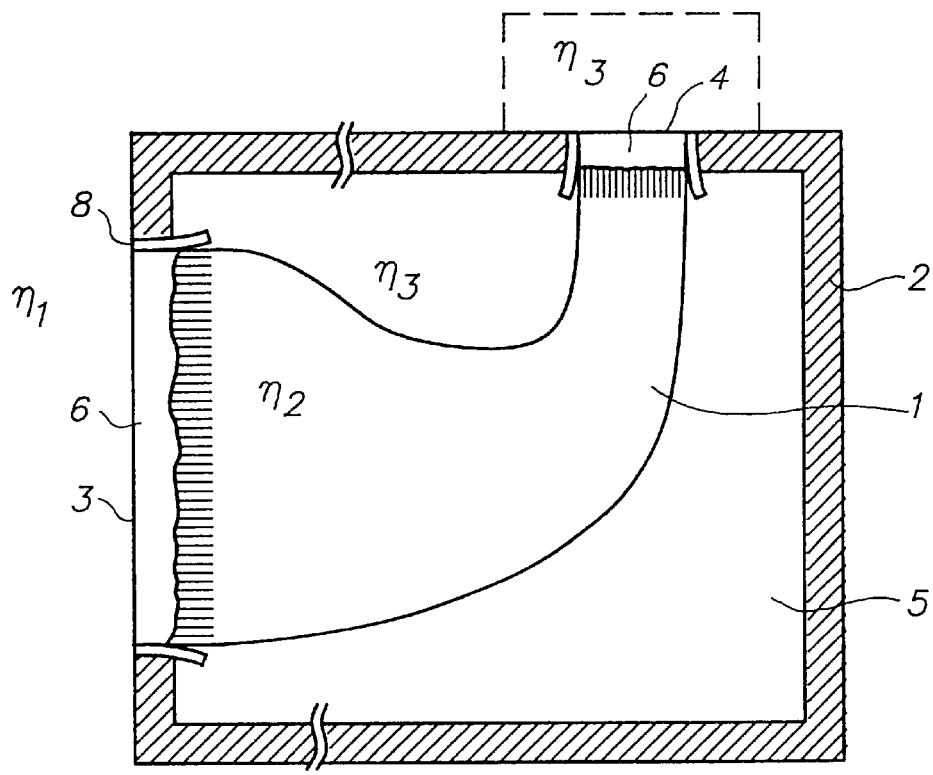
FIG. 4 shows a second embodiment of a light guide according to the present invention, the so-called side reflector type.

FIG. 4 shows a light channel arrangement of a second kind. This embodiment is referred to as the side reflector type light guide.

The light guide shown in FIG. 4 comprises a bundle of non-cladded individual light channels 1 suspended in a light and dust tight enclosure 2 made of a low evaporation type material such as aluminum or ABS "Novodur".

The bundle extends from an entrance window 3 to an output window 4. The bundle of light channels is surrounded by a cladding gas 5, having a refractive index $\eta_3$, in this example this gas is air.

At the side of entrance window 3 the individual light channels are likewise fused (by heat and pressure) to become core material blocks 6 having the shape of the light-guides windows 3 and/or 4. The fusion-depth is a few millimeters along the light-trajectory.

The core material blocks(s) 6 are suspended at the input window and occasionally at the output window not by means of optical window plates by means of side reflectors 8.

Figure 5:
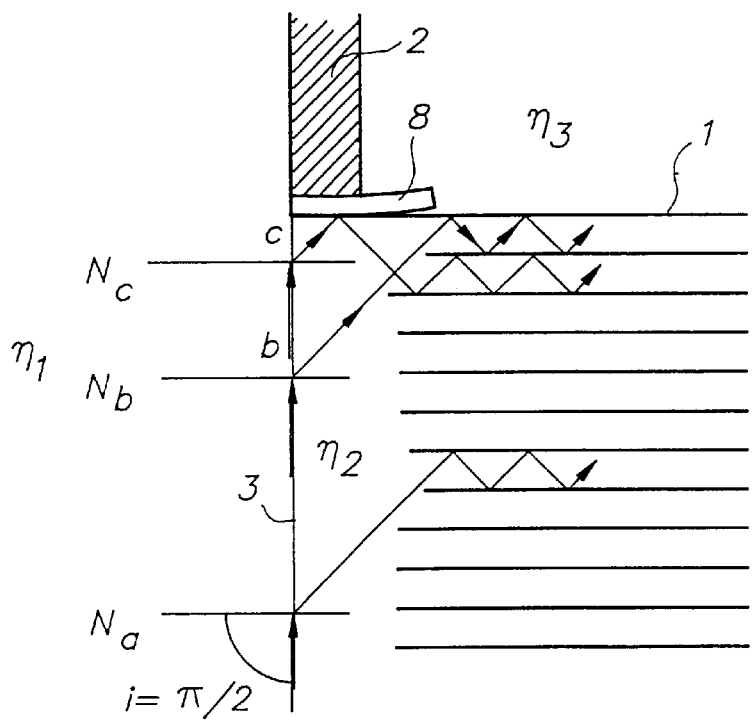
FIG. 5 illustrates the internal trajectory followed by rays entering the light guide of the second type.

This is also illustrated in FIG. 5, which shows the trajectory followed by rays of light entering the light guide at the entrance window.

Figure 6:
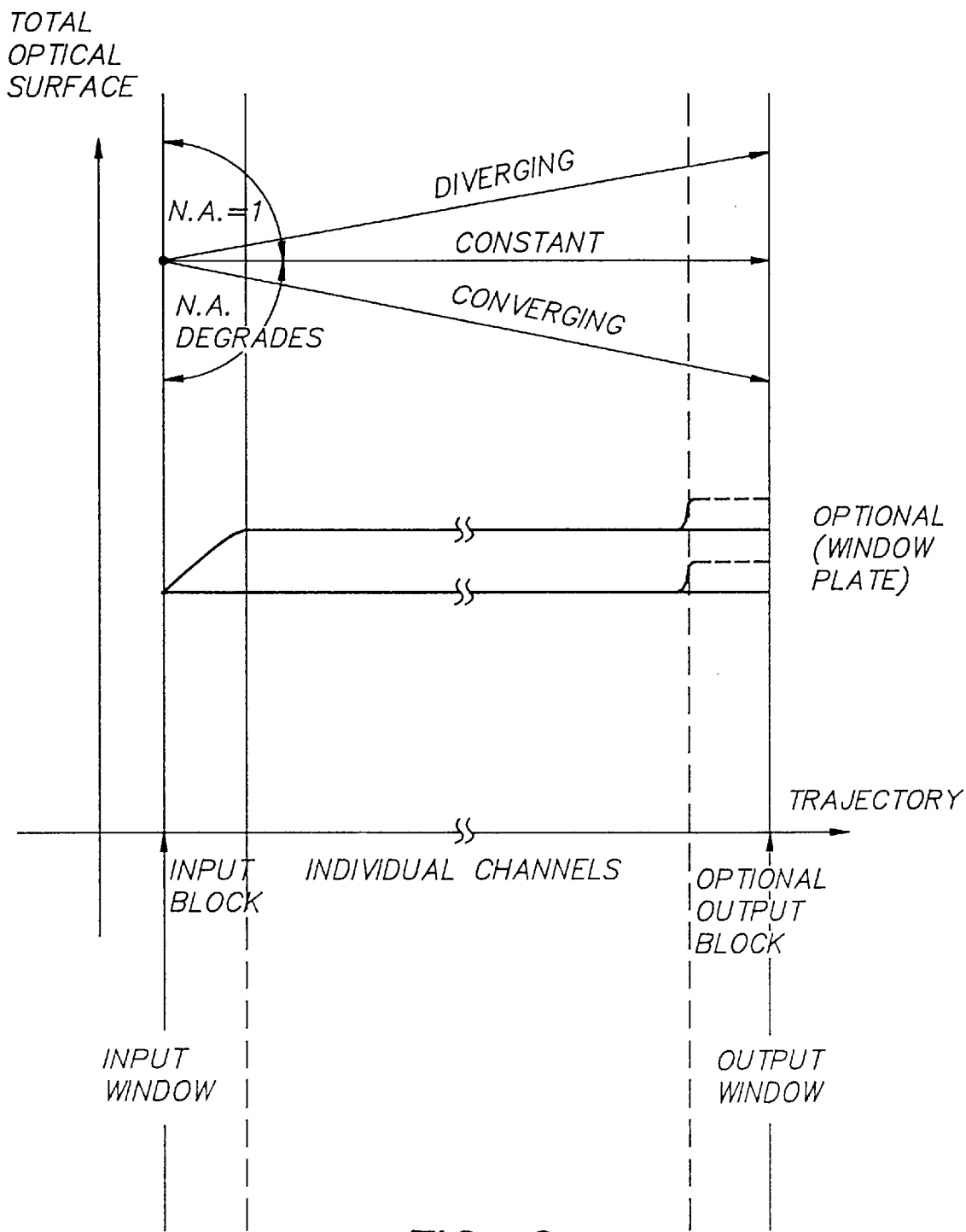
FIG. 6 illustrates the fact that the channel is preferably parallel or diverging.

The channel walls are preferably parallel or diverging resulting in constant or increasing cross-section from input to output, for reasons that will be explained below. This is illustrated in FIG. 6.

If the channel converges then it is possible that some rays which have entered the channel will, after a certain number of collisions with the inner wall of a channel, hit that wall under an angle relative to the surface normal which is smaller than the critical angle β and hence will leave the channel before reaching the output window.

For parallel channels the entrance angle of a ray with the normal on the channel remains constant because of the fact that the channel is a parallel channel, so that total internal reflection is always obtained.

For diverging channels the entrance angle increases so that the angle at which rays hit the inner wall of the channel will never become smaller than the critical angle. Consequentially these rays will always reach the end of the channel while in case of a converging channel it is possible that some rays will not reach the end of the channel (depending on the length of the channel and the degree of convergence).

Figure 7:
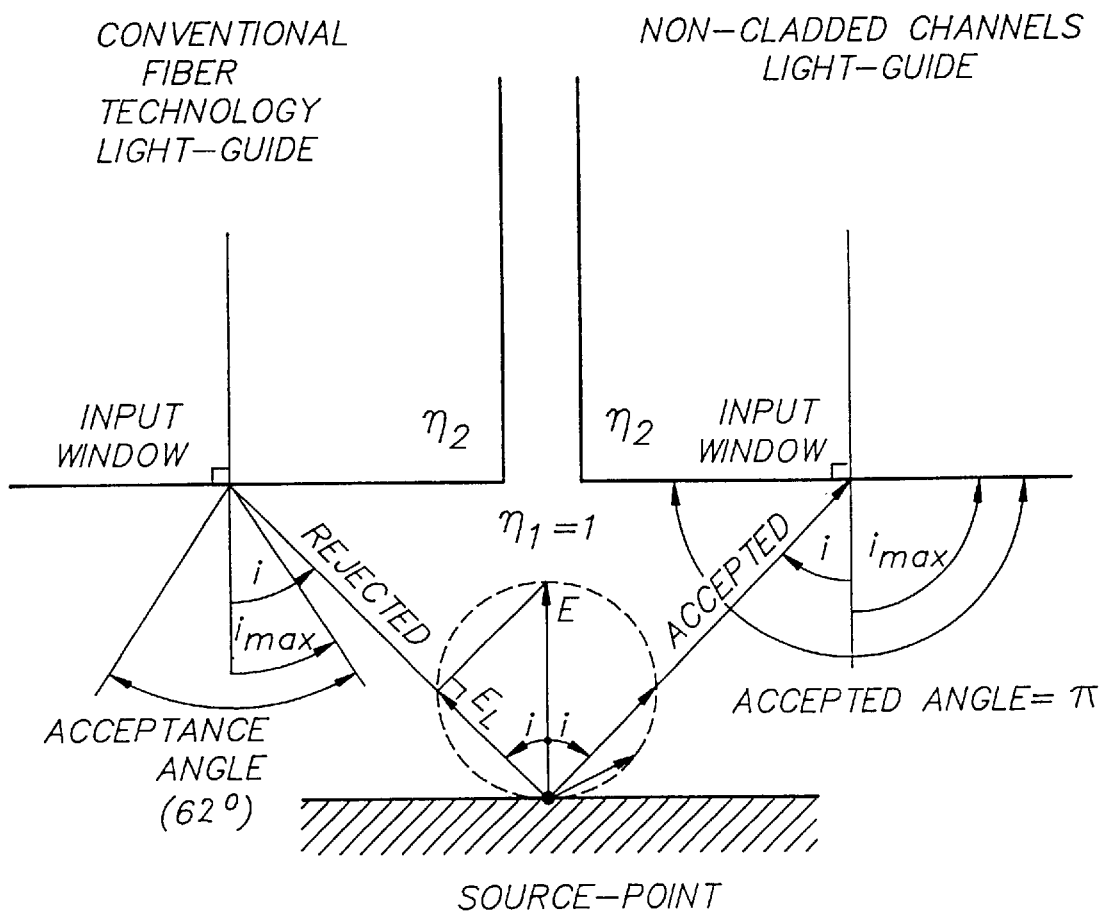
FIG. 7 illustrates a comparison of the efficiency of light guiding by a light guide according to conventional technology and by a light guide based on non-cladded channel technology.

FIG. 7 illustrates a comparison between the efficiency of light guiding by a light guide according to conventional fiber technology and a light guide based on non-cladded channel technology according to the present invention.

In the described example light is emitted by a source of radiation having a diffuse Lambertian behaviour. This kind of behaviour corresponds with the behaviour of the light that is guided in a specific application in which the present invention is used, namely in the case wherein light is emitted by a photostimulable phosphor screen upon stimulation and guided by a light guide according to the present invention towards a detector. The photostimulable phosphor screen emitting light likewise has a diffuse Lambertian behaviour.

The light emitted by a Lambertian light source can be characterised by the equation $E_L = E \cdot \cos i$ wherein E is the radiation intensity and i is the input angle.

The maximum acceptance angle is defined as the angle below which all rays of light are accepted by the fiber.

In case of conventional fiber technology this maximum acceptance angle $i_{max}$ is smaller than Π, more specifically the maximum input angle is approximately equal to 31° corresponding with a maximum acceptance angle of 62°.

For non-cladded light channels according to the present invention all input rays are accepted, i.e. the maximum input angle $i_{max}$ is equal to Π/2 and the maximum acceptance angle is equal to Π.

The maximum numerical aperture N.A. which is defined as $\eta_1 \cdot \sin i_{max}$ is thus smaller than 1 in case of conventional fiber technology (approximately 0.51) and equal to 1 in case of non-cladded fibers according to the present invention. Light rays entering a light guide of the conventional type (prior art type) under an angle which is larger than the maximal entrance angle $i_{max}$ will not be able to reach the output window of the light guide so the optical efficiency of conventional light guides is limited while for the light channels of the present invention such constraints do not exist.

These characteristics are summarised in the table below:

|  | conventional fibers | non-cladded fibers |
| --- | --- | --- |
| maximum acceptance angle | <π | =π |
| maximal numerical aperture | <1 | =1 |

Figure 8:
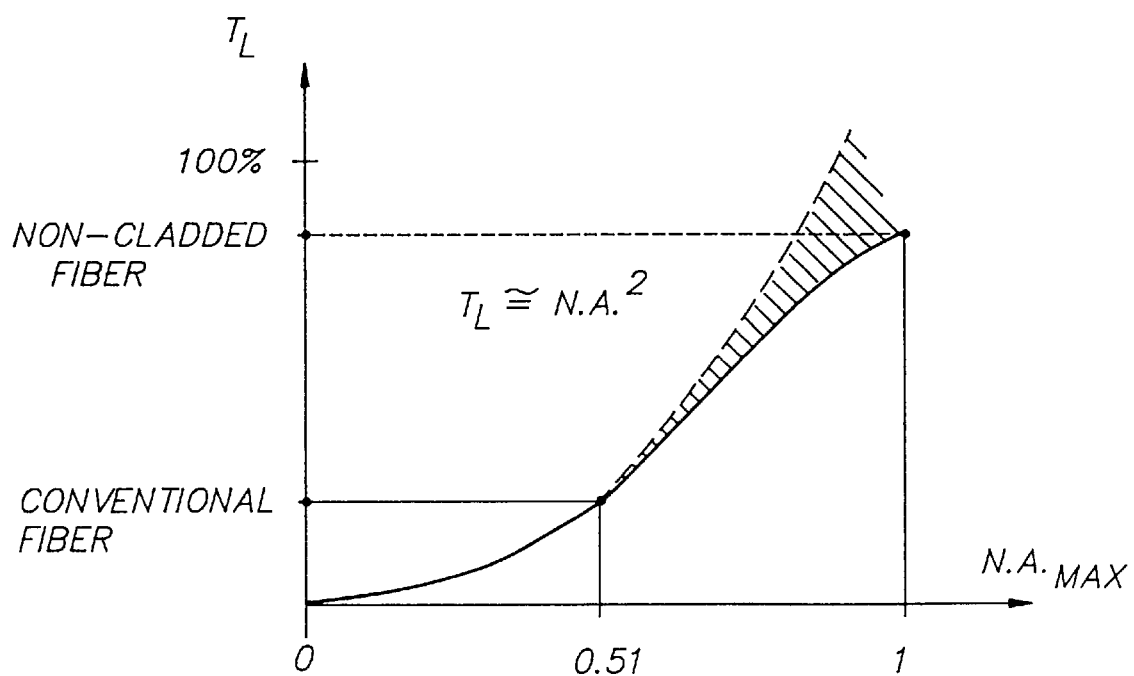
FIG. 8 shows the relation between optical efficiency and the numerical aperture for light emitted by a light source having a Lambertian behaviour.

The graph of FIG. 8 shows the relation between optical transmission efficiency (ability of transmitting light) and the numerical aperture for light emitted by a light source having a Lambertian behaviour.

The optical transmission efficiency is expressed by the 'Lambertian transmission' $T_L$ which value is proportional to $(N.A.)^2$.

The graph shows that the optical efficiency increases almost quadratically with increasing numerical aperture.

Efficiency increase is obtained with the light channels of the present invention since the lambertian translission $T_L$ which is related to the square value of the numerical aperture N.A., is theoretically equal to 100% while the lambertian transmission for fibers of the core-cladding layer type (conventional fibers) is less than 50%.

A small divergence from the quadratic behaviour at numerical aperture values that are greater than 0.5 is due to the fastly increasing Fresnel reflection losses at the input window of a light guide with increasing entrance angle.

Non-cladded fibers are thus more efficient light guides than optical fibers based on conventional fiber technology because the former appear to have a much high numerical aperture resulting in a much higher light transmission.

Also the 100% active input window provides an optimized interface of light source and light guide entrance.

Figure 9:
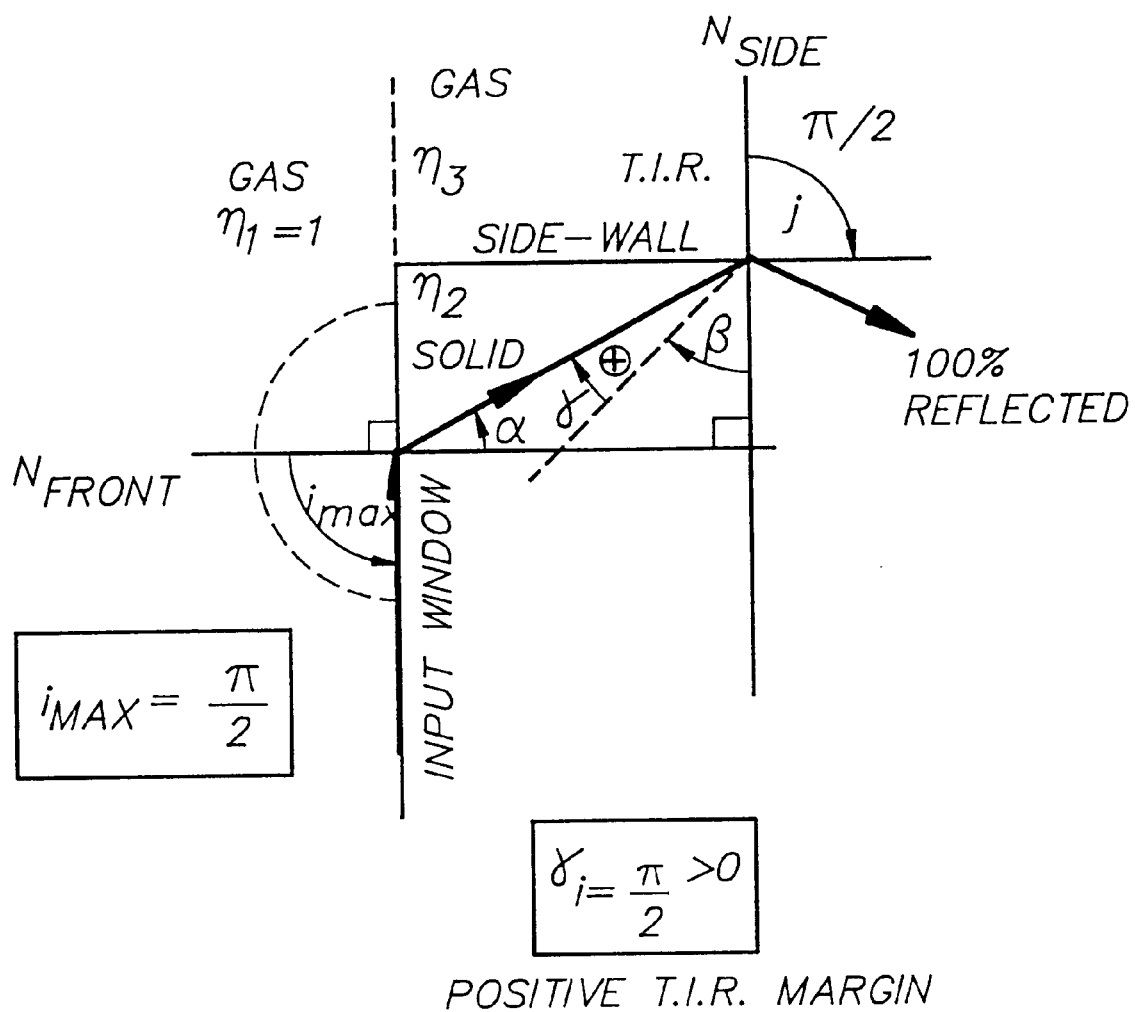
FIG. 9 illustrates the numerical aperture value attained for non-cladded light channels on the basis of the total internal reflection criterion.
Figure 10:
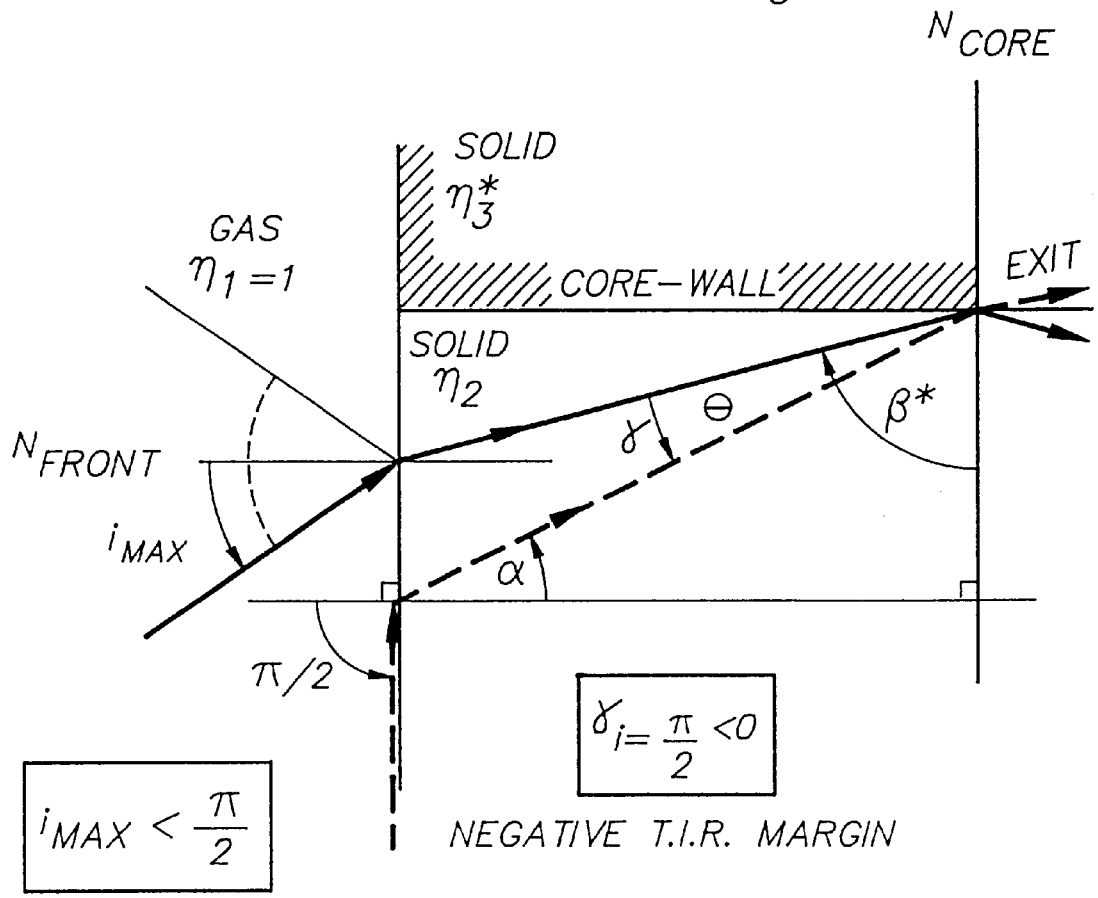
FIG. 10 illustrates the numerical aperture value attained for conventional fiber technology based prior art light guides on the basis of the total internal reflection criterion.

FIGS. 9 and 10 illustrate the difference which exists between the numerical aperture values attained for non-cladded channels and for conventional fiber technology. This explanation is based on the total internal reflection criterion. Light which falls onto the input window of a light guide will, after having been refracted, reach the output window by repeated internal, lossless reflections at the inner walls of the light channels (fibers).

FIGS. 9 and 10 also illustrate the margin available for total internal reflection of an incoming ray in both cases (prior art and according to the present invention).

Total internal reflection margins are compared for conventional light guiding optical fiber technology relative to non-cladded light guides.

FIG. 9 relates to the case of non-cladded light channels. In case of non-cladded light channels the interface at the side wall of the light channel is an interface between the material out of which the light guide made (the core material) and the cladding gas. If the cladding gas is air, it has a refractive index which is approximately equal to 1 so that the critical angle is relatively small. The critical angle is indicated as an angle β in FIG. 9. Total internal reflection is obtained when a ray hits the side wall of the light guide under an angle relative to the normal to the side wall which is larger than the critical angle β.

In FIG. 9 a ray of light is shown which is incident at maximal entrance angle $i_{max}$ equal to Π/2. The ray thus enters the light guide in a direction which is parallel to the entrance window of the light guide.

A portion of this ray is refracted at the entrance window and then enters the light guide under an angle with the normal on the entrance window being denoted α. The refracted ray is guided within the light guide onto the side-wall of the light guide where it is internally reflected because the critical angle β (being the angle below which all rays are accepted by the fiber for internal reflection) is smaller than the angle which is made by the ray relative to the normal on the side-wall of the light guide. The difference between the angle made by the ray relative to the normal on the side-wall in the point where the ray impinges the side wall and the angle β is referred to as the total internal reflection margin angle γ.

It is shown in this figure that this margin angle γ is positive. All rays that, after being refracted at the entrance window, reach the side-wall of the light guide under an angle that is larger than β will be totally internally reflected. No losses will occur.

All rays which reach the side wall at an angle which is smaller than β will leave the light guide at the side wall and will not reach the output window of the light guide.

The criterium for total internal reflection is that the angle γ needs to be positive.

The critical angle β is determined according to the following equation: β=asin ($\eta_3/\eta_2$) wherein $\eta_3$ is the refractive index of the cladding gas, and $\eta_2$ is the refractive index of the solid core material of the light channel.

If the difference between $\eta_3$ and $\eta_2$ is relatively large this will have as a consequence that the angle β is relatively small so that for a certain input angle of a rays the corresponding margin becomes relatively large.

The situation for conventional fiber technology is shown in FIG. 10.

The cladding gas is here replaced by a cladding solid material having a refractive index denoted by $\eta_{3^*}$, which is also in this case smaller than the refractive index $\eta_2$ of the core material. However, this difference is much smaller than in the previous case (see FIG. 9) so that the critical angle β* has become larger than β. Hence a ray which enters the optical fiber under an angle of Π/2 with the entrance window will, after having been refracted, reach the side wall of the core of the light guide, in this case being the interface between core and cladding material at an angle which is smaller than β*, and will thus leave the light guide at the core wall instead of being internally reflected. The ray will be absorbed and diffused inside the solid cladding layer.

To determine the maximal entrance angle within which internal reflection is always obtained, it is to be determined what the angle $i_{max}$ must be at which a ray entering under this angle $i_{max}$ will make an angle β* after being refracted at the entrance window.

This angle will certainly be smaller than Π/2. Thus this angle is certainly smaller than the result obtained in case of the light channels according to the present invention.

The explanation given above applies to straight trajectories. The situation is different when the trajectory between input and output window of the light guide is curved.

Figure 11:
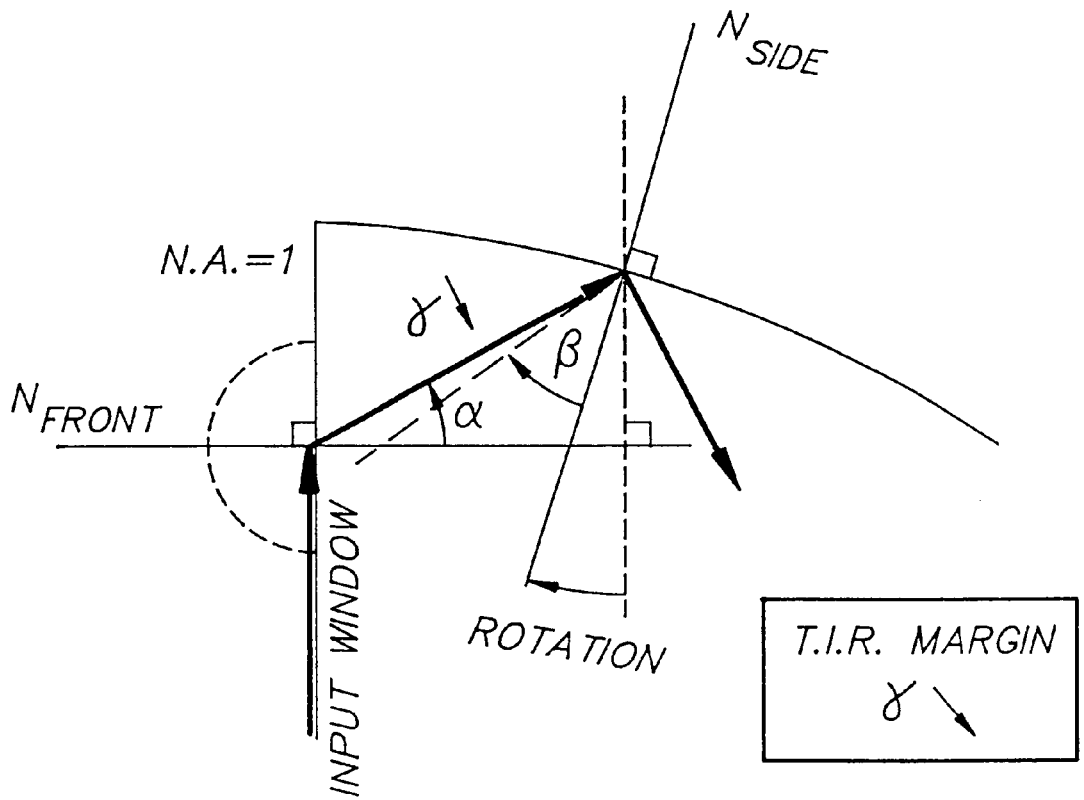
FIG. 11 illustrates the effect of curvature of the channel's trajectory on the total internal reflection margin.

FIG. 11 illustrates how the total reflection margin γ will decrease with increasing curvature of the trajectory.

FIG. 11 illustrates what happens with curved trajectories.

As a consequence of the fact that the trajectory is curved, the normal to the side wall of the light guide will rotate.

Consequentially the margin γ decreases with increasing trajectory curvature because the normal to the side wall rotates with increasing curvature towards the incoming ray.

This applies to the light guides according to the present invention as well as to the light guides according to conventional fiber technology.

From a certain curvature strength on, the margin γ will become negative which means that marginal rays which would normally be internally reflected will now leave the light channel and hence the numerical aperture of an overcurved channel might become smaller than 1.

Figure 12:
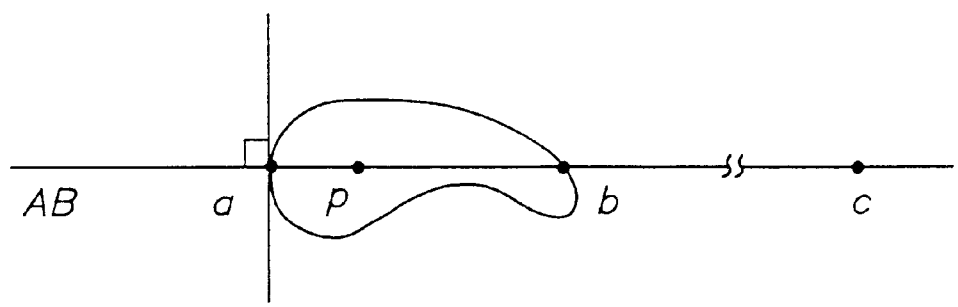
FIG. 12 illustrates the worst case orientation for curved trajectories.

FIG. 12 illustrates the worst case orientation for curved trajectories.

Incoming light travels by means of a multitude of individual optical light channels according to the present invention from an input window to an output window of the light guide.

An infinite amount of different cross sectional shapes of the individual light channels is possible. The cross section's shape can be a circle, an ellipse, a triangle, a square, a rectangular, a polygon or even any shape as depicted.

Theoretically it would even be possible to combine channels with differently shaped cross sections and diameters into a light guide.

The individual channel trajectories may thus all be different.

Most often channel trajectories are non-linear with multiple curvatures due to the different spatial locations of entrance and output window(s) of the light guide.

Channel torsion combined with natural or even engineered channel randomisation can lead to nearly unpredictable channel trajectories and to huge variations of the orientation of the channel's cross section shape relative to the center of the channel-curvature.

To attain a high throughput efficiency it is crucial that light stays into the individual channels. The channels curvatures are the weakest points in this respect since the light traveling through the channels may escape due to a local lack of total internal reflection at overcurved trajectories where the radius of curvature is too small.

The minimal curvature radius which still provides total internal reflection into the channel depends on several parameters such as numerical aperture of the light guide, refractive index of the channel material and of the surrounding cladding gas(ses), channel thickness as a function of channel cross section, shape and worst case orientation of the shape relative to the local center of channel-curvature.

Light can escape from a light guide when the angle between the steepest rays hitting the channel's surface from the inside and the line through that point of incidence and perpendicular to the channel's surface is smaller than the critical angle needed to preserve the total internal reflection character of the channel's boundaries.

This critical situation will first occur for the steepest ray internally reflected at the inner side starting point of a curvature with a critical radius given the channel's cross sectional shape is at its worst case orientation relative to the curvature center resulting in a highest channel thickness.

The worst case shape orientation relative to a line AB containing the center of local curvature c can be found in general if the following conditions are met:
For all point a, b of the channel's contour (1) line AB is perpendicular to the surface tangent in point a, (2) the distance between the points a and b is a maximum, (3) all points p on the line AB between points a and b are points of the channel's cross section.

The worst case thus occurs when the largest channel thickness occurs in the plane of curvature perpendicular to the surface tangent in point b because in this case the largest distance is covered relative to the radius of curvature resulting in the highest angular rotation of the outer-curve surface normal towards the incoming ray.

In this way it can be determined what the worst case thickness and orientation of an arbitrary shape will be.

In an apparatus one has very little knowledge and/or control on the orientation of the light channels, it is necessary to be able to determine a worst case and to see that this worst case is not obtained.

Figure 13:
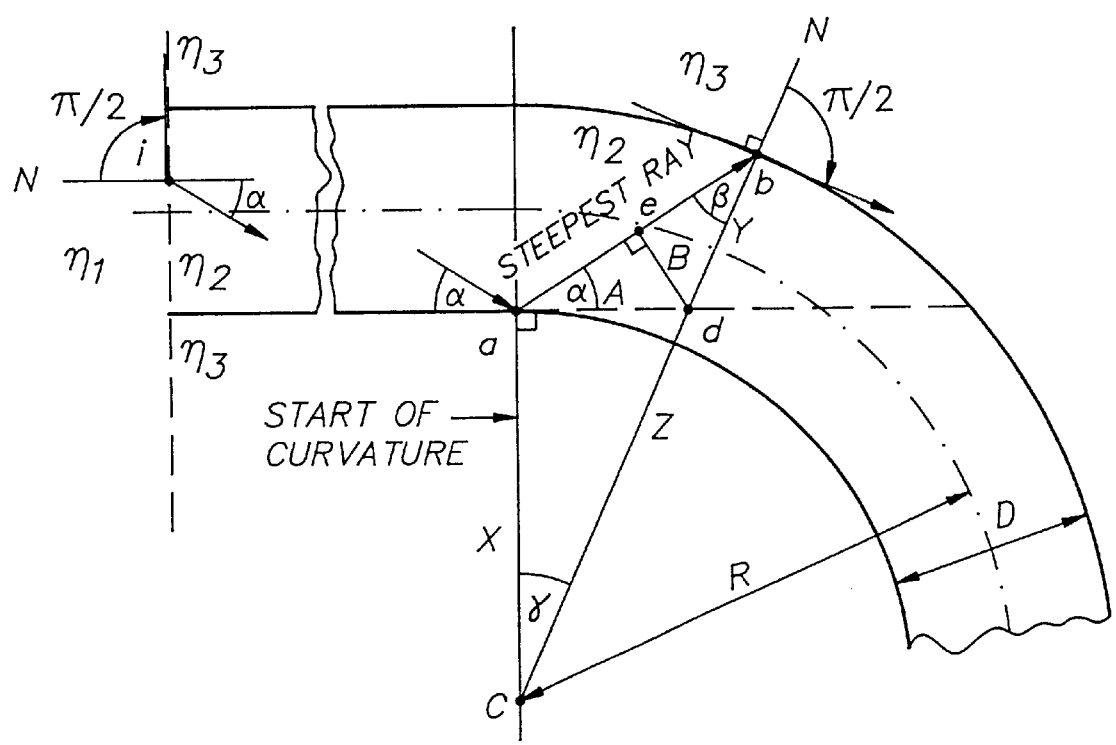
FIG. 13 is an illustration of trajectory curvature.

In the following this worst case is calculated. Reference is made to FIG. 13.

FIG. 13 graphically represents a light channel with a numerical aperture N.A. equal to 1.

The following calculations are based on a study of the behaviour of a ray of radiation which impinges the entrance window under an angle equal to Π/2 (corresponding with a numerical aperture equal to 1, see above).

This ray is refracted at the entrance window and enters the light guide under an angle denoted by α and impinges the inner surface of the light channel at location 'a' located at the start of the curvature.

This ray represents the steepest ray since for all other rays entering the entrance window the angle of entrance in the light channel after refraction at the entrance window will be smaller than $\alpha$.

This steepest ray starting from point 'a' will travel to the other side of the channel (outer side of the curvature), point 'b'. This travel path is the most critical.

It is to be calculated how much a channel can be curved so that the steepest ray will leave the channel at the outer side of the channel for predetermined worst case channel thickness and orientation.

This is expressed by the ratio of largest acceptable channel thickness D to the minimal radius of curvature R to be determined, which still provides marginal ($\gamma=0$) total internal reflection for the ray along the path from 'a' to 'b'.

If the radius of curvature is larger that the calculated limit, then all rays will travel through the channel by internal reflection, no light will be lost due to rays not being internally reflected.

$$R = \frac{(Y+Z)+X}{2} \quad D = (Y+Z)-X$$

$$\frac{R}{D} = \frac{(Y+Z)+X}{2[(Y+Z)-X]}$$

$$A = X \cdot \tan\gamma \quad \Delta\,adc$$
$$B = A \cdot \sin\alpha \quad \Delta\,ade$$
$$Y = B/\sin\beta \quad \Delta\,bde$$

$$Y = \frac{\sin\alpha \cdot \tan\gamma}{\sin\beta} \cdot X \quad Z = \frac{X}{\cos\gamma} \quad \Delta\,adc$$

After substitution of Y(X) and Z(X) into R/D:

$$\alpha = \arcsin\left(\frac{\eta_1}{\eta_2} \cdot \sin\frac{\pi}{2}\right) \quad \text{Snell's Law at input}$$

$$N.A. = 1, i = \frac{\pi}{2})$$

$$\beta = \arcsin\left(\frac{\eta_3}{\eta_2} \cdot \sin\frac{\pi}{2}\right) \quad \text{Snell's Law at point } b$$

$$(\beta = \text{CRITICAL ANGLE, } j = \frac{\pi}{2})$$

$$\gamma = \frac{\pi}{2} - \alpha - \beta \quad \Delta\,abc$$

$$\Delta = \frac{\sin\alpha \cdot \tan\gamma}{\sin\beta} + \frac{1}{\cos\gamma}$$

$$R = \frac{\Delta+1}{2(\Delta-1)} \cdot D$$

Special case if $\eta_3=\eta_1$ then $\alpha=\beta$
Conclusion:

$$\frac{R}{D}(N.A.=1) > \frac{\Delta+1}{2(\Delta-1)}$$

The above calculations have been applied to a wide range of input angles between 0° and 90°. This enables the calculation of the minimal R/D ratio for an arbitrary angle of acceptance.

Figure 14:
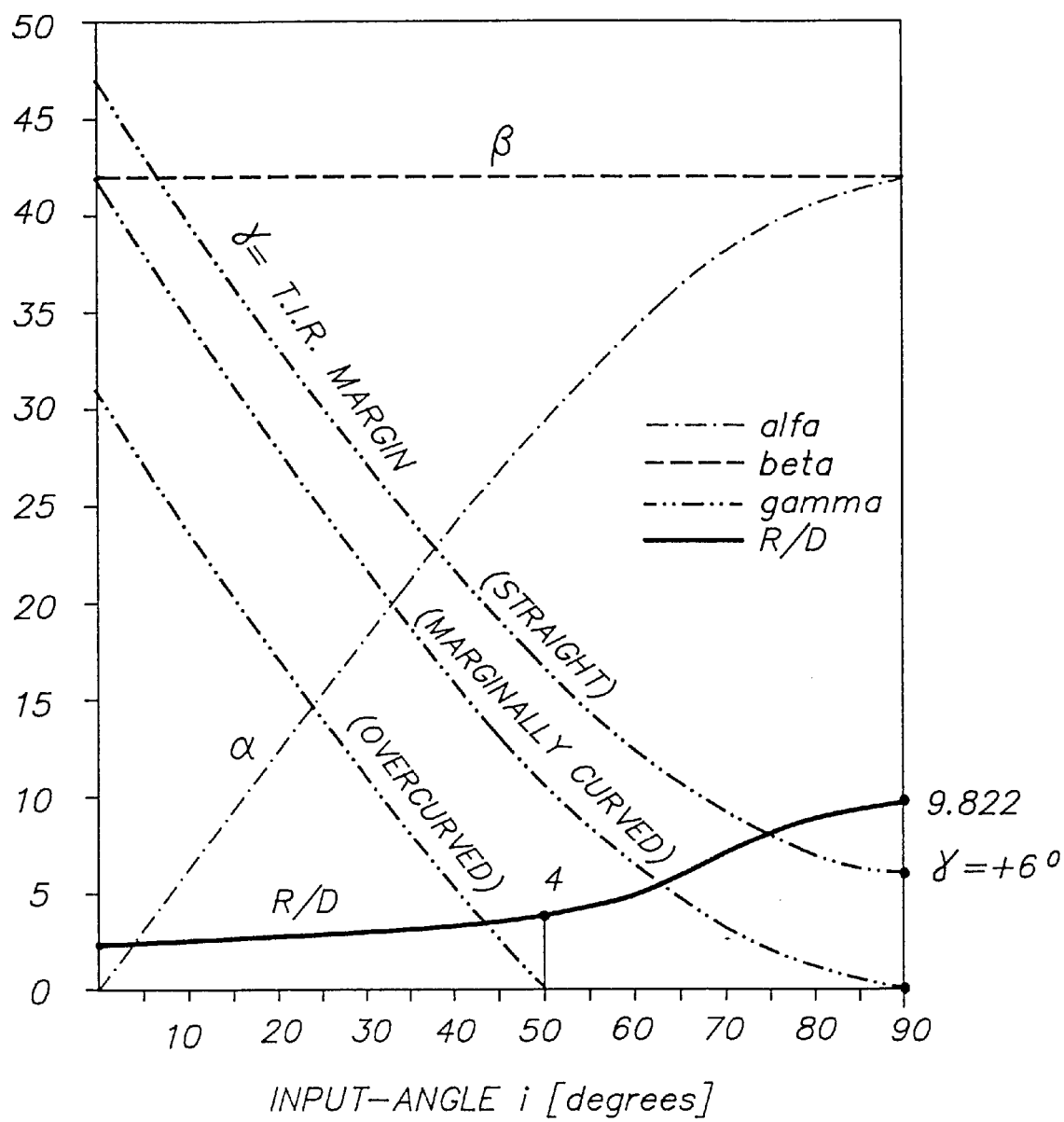
FIG. 14 shows the minimal R/D ratio for an arbitrary angle of acceptance for the case of a non-cladded light channel, FIG. 15 indicates the numerical aperture as a function of the R/D curvature for a non-cladded light channel.

FIG. 14 applies to an example of a non-cladded core channel with cladding gas, for the combination: air/Polymethylmethacrylate (PMMA)/air. So in this example $\eta_1=\eta_3=1$ and $\eta_2=1.492$.

The following formulae are applied:

$$\alpha = \arcsin((\eta_1/\eta_2)*\sin(i))$$

$$\beta = \arcsin(\eta_3/\eta_2))$$

$$\gamma = 90 - \alpha - \beta$$

$$\delta = \sin\alpha \cdot \tan\gamma/\sin\beta + (1/\cos\gamma)$$

$$R/D = (\delta+1)/(2.(\delta-1))$$

$$N.A. = \eta_{i-1} \sin i_{max} < (1.492^2 - 1^2)^{1/2}$$

In this example we see that the angle $\alpha$ increases sinusoidally with increasing entrance angle i (from zero to 90degrees). Furthermore, due to the fact that in this example $\eta_1=\eta_3$, the angle $\alpha$ is identical to the angle $\beta$ for $i=\Pi/2$.

For a straight channel, the margin angle $\gamma$ which is given by the equation $\gamma=\Pi/2-\alpha-\beta$ decreases with increasing entrance angle from a value of approximately 48 degrees to a positive minimum value of 6 degrees. The margin angle of 6 degrees corresponds to an entrance angle of $\eta/2$ and thus constitutes the positive margin angle which is available in the case of light guides according to this invention comprising non-cladded light channels.

It can thus be concluded that all rays entering with an entrance angle between zero and 90 degrees are guided by internal reflection within a straight light channel. Furthermore, the 6 degree positive $\gamma$ margin can be used to a certain extent for additional curvature of the light guide thereby preseving total internal reflection for all the rays.

As the light channel is curved the total internal reflection margin (T.I.R. margin) also decreases. In this figure the graph representing the T.I.R. margin $\gamma$ has been drawn for which at an entrance angle of $\Pi/2$ the zero T.I.R. margin is obtained. This graph is referred to as 'marginally curved'. This situation occurs if the R/D curvature value equals 9.822.

A third graph is an example of an overcurved situation, i.e. a situation where a zero T.I.R. margin is already attained for input angles smaller than $\Pi/2$. This graph is referred to as 'overcurved'. In the drawn example a zero TIR margin is attained for an input angle of 50 degrees.

From this figure it can also be concluded that for example for rays entering with an entrance angle of 50 degrees (acceptance angle equal to 100 degrees), total internal reflection will be obtained (and hence no loss of efficiency) on condition that R/D is greater than 4. For values of R/D which are smaller than 4, not all rays will be internally reflected.

Figure 15:
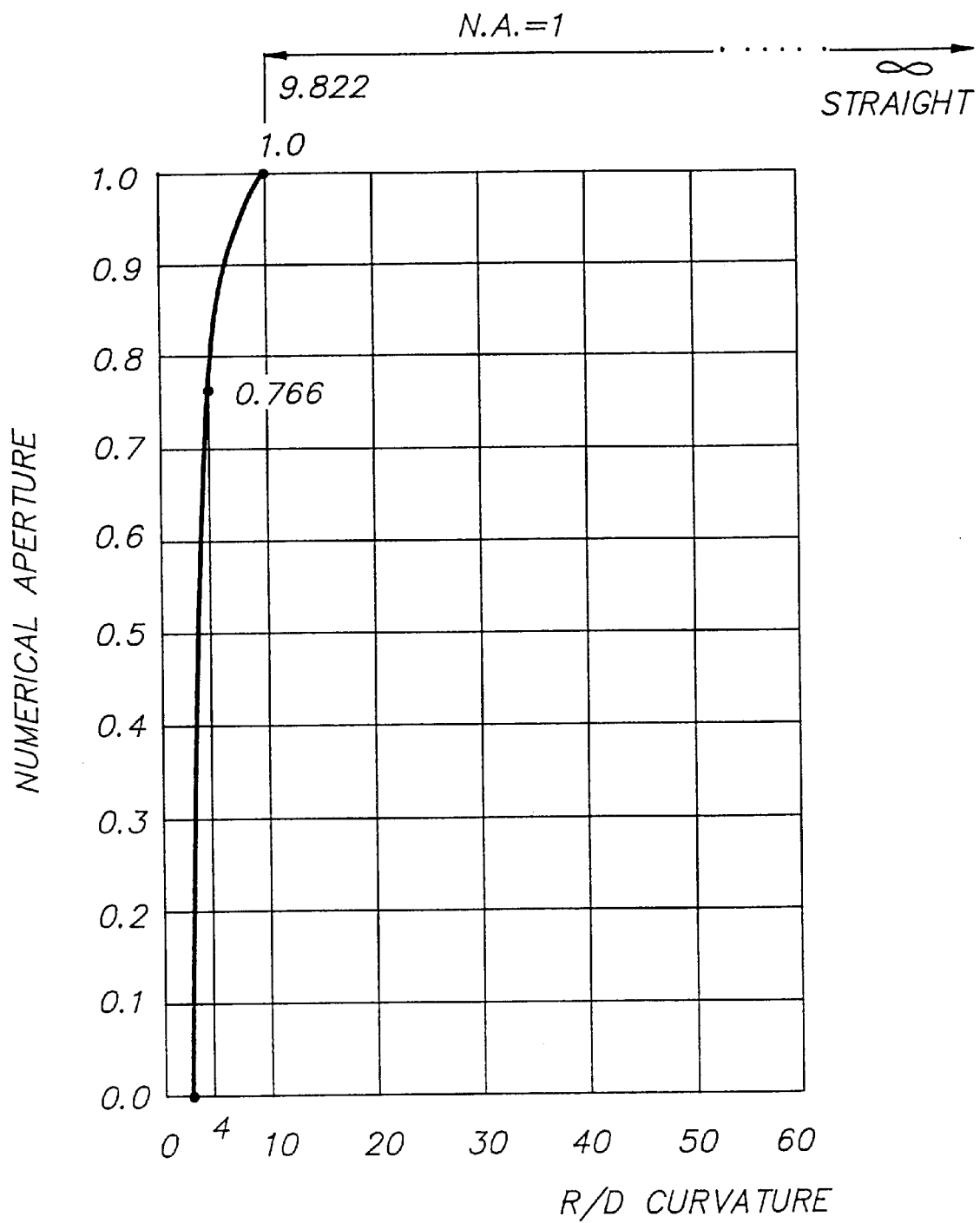

The numerical aperture can also be calculated by applying the formula $N.A.=\eta_1.\sin i_{max}$. In FIG. 15 the numerical aperture is indicated as a function of the R/D curvature value.

For a non-cladded channel according to the present invention, the numerical aperture is equal to the maximum value 1 for straight channels and remains equal to '1' for curved channels until the ratio R/D is equal to about 10. Further, for still smaller values of R/D the numerical aperture decreases but is still equal to 0.766 for an R/D value equal to 4.

Figure 16:
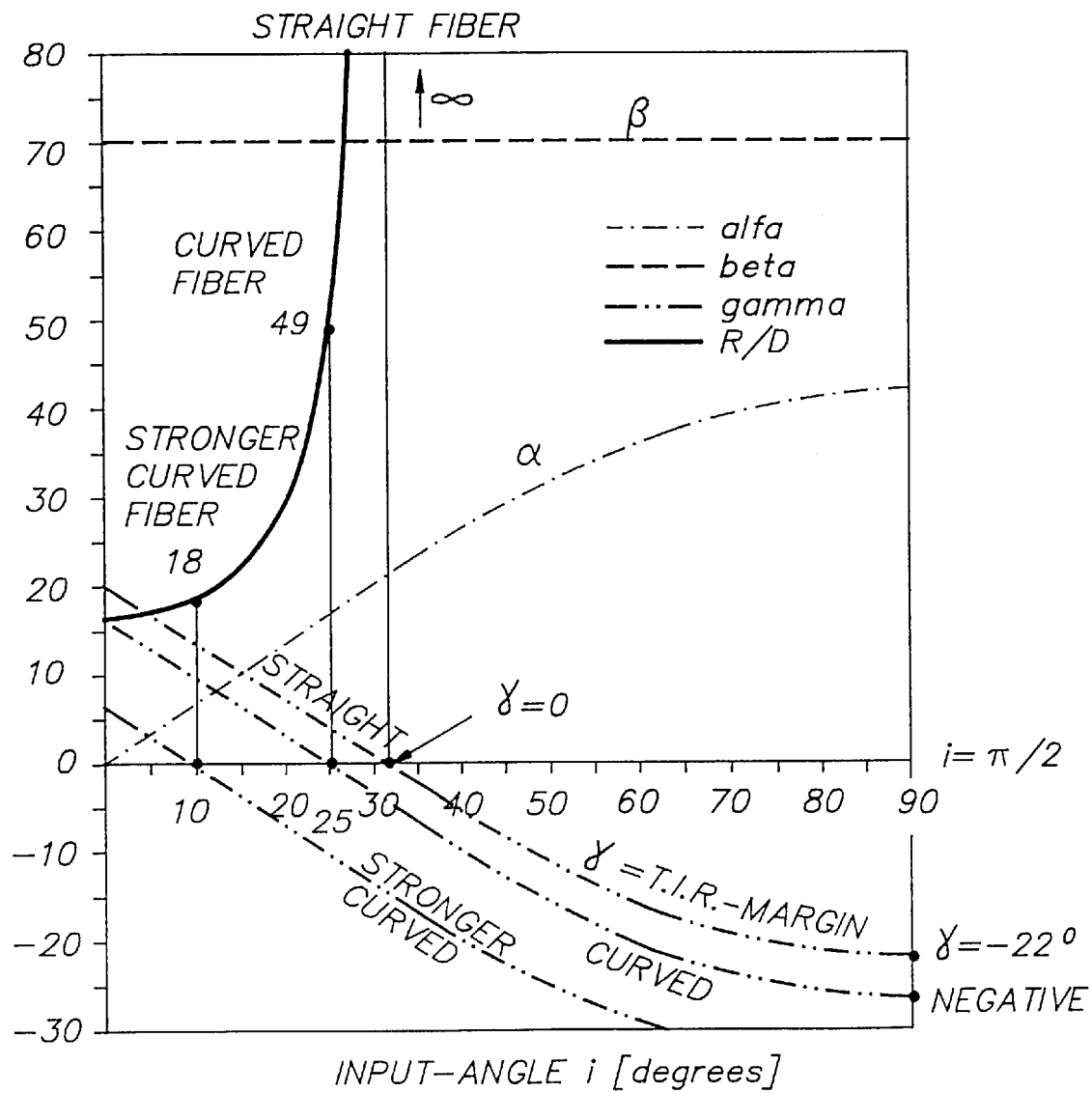
FIG. 16 shows the minimal R/D ratio for an arbitrary angle of acceptance for the case of a conventional prior art light guide consisting of a core material surrounded by a solid cladding material, FIG. 17 indicates the numerical aperture as a function of the R/D curvature for a conventional prior art light guide consisting of a core material surrounded by a solid cladding material.

FIG. 16 applies to an example of a conventional prior art light guide consisting of a core material surrounded by a solid cladding material.

FIG. 16 relates to a commercially available light guide which has a numerical aperture equal to 0.51 (acceptance angle equal to 62°). The light guide consists of a core material and a cladding solid material which has a refractive index equal to 1.402.

The following formulae are applied:

$\alpha = \arcsin((\eta_1/\eta_2)*\sin(i))$ $\beta = \arcsin(\eta_3/\eta_2)$ $\gamma = 90 - \alpha - \beta$ $67 = \sin\alpha \cdot \tan\gamma/\sin\beta + (1/\cos\gamma)$ $R/D = (\delta+1)/(2 \cdot (\delta-1))$ N.A.$=\eta_{i-1} \sin i_{max} = (1.492^2 - 1.402^2)^{1/2} = 0.51$ for a straight fiber By comparing FIGS. 14 and 16 one can conclude that the behaviour of the angle $\alpha$ as a function of the input angle is identical since the ratio of indices of refraction ($\eta_1/\eta_2$) at the input window has not changed.

On the other hand, the critical angle $\beta$ has increased to a large extent due to the higher index of refraction of the cladding material when compared with the cladding gas used in the light guiding means in accordance with the present invention.

The T.I.R. margin (for straight trajectory) has decreased and attains a negative value of minus 22 degrees at an input angle i equal to $\Pi/2$.

The zero crossing of the graph representing the T.I.R. margin is found at an input angle of 30.7 degrees equivalent to a numerical aperture N.A. equal to 0.51.

At an R/D value equal to 49, the maximal input angle has decreased to 25° (numerical aperture 0.42) and at even larger curvature, e.g. at an R/D value equal to 18, the maximal input angle has decreased to 10° (numerical aperture 0.17).

A minimal ratio R/D equal to 16.078 is required to obtain propagation of all rays entering at zero degrees (maximal input angle equal to zero) via the prior art light guiding means towards the output window. This represents a N.A. equal to zero. Only collimated light sources are able to send light through the thus curved fiber.

Figure 17:
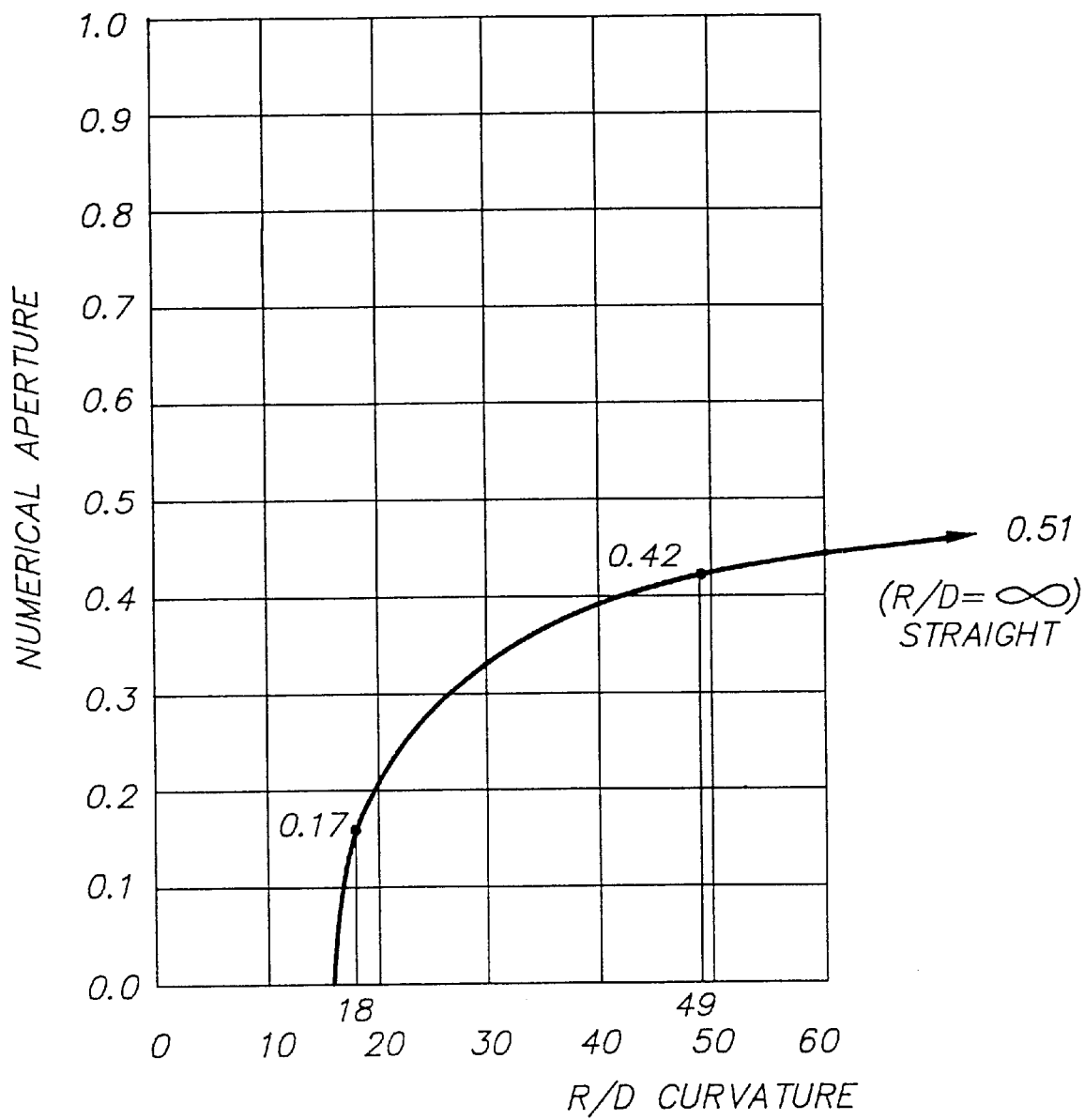

The graph shown in FIG. 17 shows the behaviour of the numerical aperture as a function of the curvature of the trajectory for conventional optical fibers. This figure is to be compared with FIG. 15, which shows the numerical aperture as a function of the curvature of the trajectory for non-cladded fibers according to the invention.

It is to be noted that the numerical aperture decreases when the trajectory is curved due to the absence of any T.I.R. margin for conventional light guides.

Figure 18:
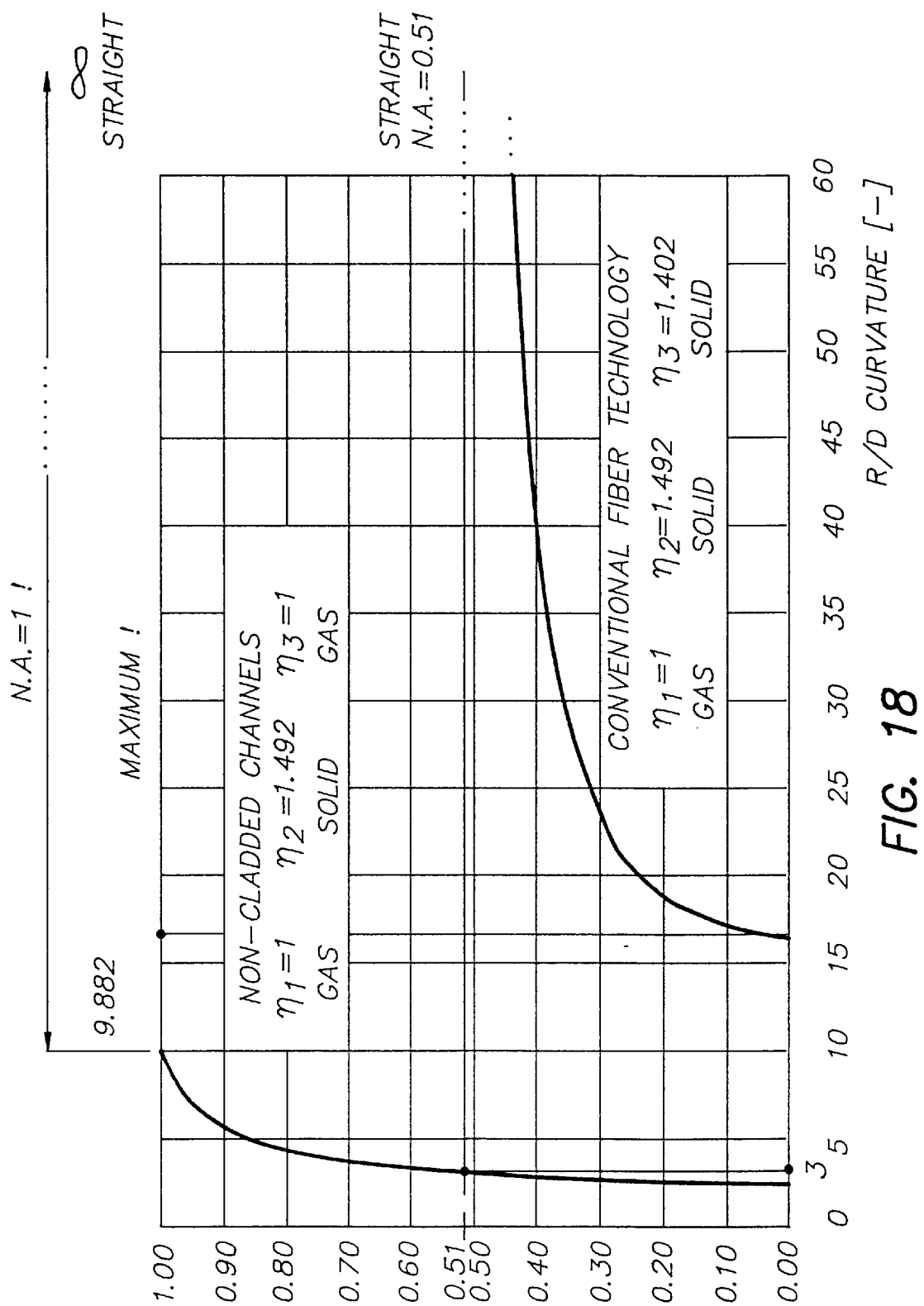
FIG. 18 illustrates the most important differences between the characteristics of non-cladded light channels and conventional cladded light guides.

FIG. 18 shows the most important differences between the characteristics of non-cladded light channels according to the present invention and prior art light guides based on conventional optical fibers having a core and a solid cladding material surrounding the core.

It is to be retained that, especially for light sources with Lambertian behaviour, the optical efficiency of a light guide increases with increasing numerical aperture.

From FIG. 18 the following can be concluded:
For Straight Trajectories:

For straight trajectories the maximal numerical aperture is different for conventional fiber technology and for non-cladded light channels.

Non-cladded channels according to the present invention have a numerical aperture equal to 1.

The maximal numerical aperture for conventional fiber technology is less than 1.
For Curved Trajectories:

For non-cladded channels the value of the numerical aperture remains equal to 1 for even strong curvature of the trajectory of the light channel. For conventional fiber technology this value decreases from the slightest curvature of the channel on.

A light guide based on conventional fiber technology that is curved to such an extent that it has a R/D value smaller than 16.078 is no longer able to transmit a single ray of light from an entrance window to an output window. Furthermore, the numerical aperture of such a light guide attains a value equal to zero while for non-cladded channels the numerical aperture at this curvature is still maximal and equal to 1.

For non-cladded channels the numerical aperture remains constant within a wide range of degrees of curvature strength. The value only starts to decrease for curved trajectories having an R/D value which is smaller than 9.822.

The non-cladded channels attain the maximal numerical aperture of conventional fiber technology when they are curved to a large extent, namely when R/D is equal to 3.

From the above one can conclude that non-cladded light channels according to the present invention are more efficient and can be made more compact than light guides based on conventional state of the art fiber technology since (1) they have the highest, approximately constant numerical aperture value when transmitting light emitted by a lambertian light source at the input window and (2) they can be curved to a large extent at an identical or even higher numerical aperture than conventional fibers.

Additionally, due to the lower sensitivity to channel curvature the light guide can be made more compact by using a much smaller curvature radius for the same fiber diameter resulting in the same or higher efficiency compared to a light guide based on conventional fiber technology.

What is claimed is:

1. A light guide comprising an entrance window, an output window and a multiplicity of light channels for transmitting light falling onto the entrance window towards the output window by internal reflection, wherein each of said multiplicity of light channels entirely consists of a solid light guiding core material that is enclosed in a cladding gas having a refractive index that is lower than the refractive index of the core material, and wherein each light channel has an increasing cross section from the entrance window to the output window.

2. A light guide comprising an entrance window, an output window and a multiplicity of light channels for transmitting light falling onto the entrance window towards the output window by internal reflection, wherein each of said multiplicity of light channels entirely consists of a solid light guiding core material that is enclosed in a cladding gas having a refractive index that is lower than the refractive index of the core material, and wherein the ends of said light channels near to said entrance and/or output window are fused to a core material block that is suspended by means of a window plate.

3. A light guide comprising an entrance window, an output window and a multiplicity of light channels for transmitting light falling onto the entrance window towards the output window by internal reflection, wherein each of said multiplicity of light channels entirely consists of a solid light guiding core material that is enclosed in a cladding gas having a refractive index that is lower than the refractive index of the core material, and wherein the ends of said light channels near to said entrance and/or output window are fused to a core material block that is suspended by means of reflectors.

4. A light guide comprising an entrance window, an output window and a multiplicity of light channels for transmitting light falling onto the entrance window towards the output window by internal reflection, wherein each of said multiplicity of light channels entirely consists of a solid light guiding core material that is enclosed in a cladding gas having a refractive index that is lower than the refractive index of the core material, and wherein each light channel has a maximum acceptance angle of $\Pi$ radians.

5. A light guide comprising an entrance window, an output window and a multiplicity of light channels for transmitting light falling onto the entrance window towards the output window by internal reflection, wherein each of said multiplicity of light channels entirely consists of a solid light guiding core material that is enclosed in a cladding gas having a refractive index that is lower than the refractive index of the core material, and wherein each light channel has a maximum numerical aperture equal to 1.

* * * * *